United States Patent
Li et al.

(10) Patent No.: US 10,369,553 B2
(45) Date of Patent: Aug. 6, 2019

(54) SUSPENDED-BED HYDROGENATION CATALYST AND REGENERATION METHOD THEREFOR

(71) Applicant: Beijing Huashi United Energy Technology and Development Co., Ltd., Beijing (CN)

(72) Inventors: Lin Li, Beijing (CN); Ke Lin, Beijing (CN); Chuntao Li, Beijing (CN)

(73) Assignee: BEIJING HUASHI UNITED ENERGY TECHNOLOGY AND .DEVELOPMENT CO., LTD, Beijing (CN)

(*) Notice: Subject to any disclaimer, the term of this patent is extended or adjusted under 35 U.S.C. 154(b) by 103 days.

(21) Appl. No.: 15/656,671

(22) Filed: Jul. 21, 2017

(65) Prior Publication Data

US 2018/0021761 A1    Jan. 25, 2018

(30) Foreign Application Priority Data

Jul. 22, 2016   (CN) .......................... 2016 1 0586959
Aug. 1, 2016    (CN) .......................... 2016 1 0622128

(51) Int. Cl.

| | |
|---|---|
| B01J 29/14 | (2006.01) |
| B01J 29/16 | (2006.01) |
| B01J 29/46 | (2006.01) |
| B01J 29/48 | (2006.01) |
| B01J 29/80 | (2006.01) |
| B01J 29/90 | (2006.01) |
| B01J 35/02 | (2006.01) |
| B01J 35/10 | (2006.01) |
| B01J 37/00 | (2006.01) |
| B01J 37/06 | (2006.01) |
| B01J 37/08 | (2006.01) |
| C10G 49/04 | (2006.01) |
| C10G 49/08 | (2006.01) |
| B01J 38/02 | (2006.01) |
| B01J 38/06 | (2006.01) |
| B01J 38/72 | (2006.01) |

(52) U.S. Cl.
CPC .......... *B01J 29/166* (2013.01); *B01J 29/146* (2013.01); *B01J 29/46* (2013.01); *B01J 29/48* (2013.01); *B01J 29/80* (2013.01); *B01J 29/90* (2013.01); *B01J 35/023* (2013.01); *B01J 35/1095* (2013.01); *B01J 37/009* (2013.01); *B01J 37/0036* (2013.01); *B01J 37/06* (2013.01); *B01J 37/08* (2013.01); *B01J 37/084* (2013.01); *B01J 37/088* (2013.01); *B01J 38/02* (2013.01); *B01J 38/06* (2013.01); *B01J 38/72* (2013.01); *C10G 49/04* (2013.01); *C10G 49/08* (2013.01); *B01J 2229/186* (2013.01); *B01J 2229/20* (2013.01); *B01J 2229/36* (2013.01); *B01J 2229/37* (2013.01)

(58) Field of Classification Search
None
See application file for complete search history.

(56) References Cited

U.S. PATENT DOCUMENTS

| | | | |
|---|---|---|---|
| 2002/0051878 A1* | 5/2002 | Lussier .................... | B01J 21/04 428/325 |
| 2009/0145807 A1* | 6/2009 | Choi ..................... | C10G 55/04 208/211 |
| 2011/0167713 A1 | 7/2011 | Quignard et al. | |

FOREIGN PATENT DOCUMENTS

| | | |
|---|---|---|
| CN | 1307926 A | 8/2001 |
| CN | 201351763 Y | 11/2009 |
| CN | 102310005 A | 1/2012 |
| CN | 103242871 A | 8/2013 |
| CN | 204051658 U | 12/2014 |
| CN | 104388117 A | 3/2015 |
| CN | 104588079 A | 5/2015 |
| CN | 204752627 U | 11/2015 |
| WO | WO 97/33691 | 9/1997 |

OTHER PUBLICATIONS

Russian First Office Action for Russian Application No. 2017125485/04 dated Jun. 21, 2018.
CN 201610586959.7, Jul. 22, 2016, CN107638889.
CN 201610622128.0, Aug. 1, 2016, CN107670699.

* cited by examiner

*Primary Examiner* — Melvin C. Mayes
*Assistant Examiner* — Michael Forrest
(74) *Attorney, Agent, or Firm* — Reches Patents

(57) ABSTRACT

A suspended-bed hydrogenation catalyst and a regeneration method are disclosed. A composite support comprises a semi-coke pore-expanding material, a molecular sieve and a spent catalytic cracking catalyst. The hydrogenation catalyst for heavy oil is obtained through mixing the semi-coke pore-expanding material, the molecular sieve and the spent catalytic cracking catalyst, followed by molding, calcining and activating, and then loading an active metal oxide to the composite support. According to the composite support, a macropore, mesopore and micropore uniformly-distributed structure is formed, so that full contact between all ingredients in the heavy oil and active ingredients in a hydrogenation process is facilitated, and the conversion ratio of the heavy oil is increased. The hydrogenation catalyst integrates adsorption, cracking and hydrogenation properties. According to a regeneration method, the loading performance of an active-metal-loaded support in a spent hydrogenation catalyst cannot be destroyed.

11 Claims, No Drawings

SUSPENDED-BED HYDROGENATION CATALYST AND REGENERATION METHOD THEREFOR

TECHNICAL FIELD

The present invention belongs to the technical field of preparation and regeneration of catalysts and specifically relates to a suspended-bed hydrogenation catalyst adopting a composite support and used for heavy oil and a regeneration method for the suspended-bed hydrogenation catalyst.

BACKGROUND

Along with the development of economy and society, petroleum resources are increasingly scarce and show inferior and heavy trends, thus, heavy and inferior crude oils are required to be processed so as to make the heavy and inferior crude oils into light oils. In the field of petrochemical industry, a suspended-bed hydrogenation process is an optimal way for light oil conversion of heavy/inferior oil such as heavy oil, residual oil and high-temperature coal tar, and the technology can be used for treating heavy/inferior oil feedstocks with higher metal and sulfur content and has the characteristics of high feedstock adaptability, simple process, high conversion ratio and demetalization ratio, high light oil yield, and so on, thereby being extensively used.

Among numerous conditions affecting the suspended-bed hydrogenation process, the hydrogenation catalyst is undoubtedly the most important factor, and the quality of the hydrogenation catalyst can directly affect the demetalization ratio and light oil yield of a light oil conversion process of the heavy and inferior crude oils. The existing suspended-bed hydrogenation catalysts can be generally divided into three major categories, i.e., solid-particle catalysts, loaded type catalysts and dispersed type catalysts, wherein the loaded type catalysts are extensively applied to the suspended-bed hydrogenation process due to the advantages of simplicity in preparation, easiness in morphology control, good coking inhibiting properties, recyclability, etc. The loaded type catalysts are composed of supports and active components, and the catalytic performance of the loaded type catalysts lies on the inherent catalytic characteristics of the active components, the properties of the supports and the load characteristic between the active components and the supports, so that improvement on the catalytic activity of the loaded type catalysts is facilitated through reasonably proportioning the supports and the active components.

For example, a preparation method for a residual oil hydrotreating catalyst is disclosed by a Chinese Patent Document CN 104588079 A. The method comprises the steps: (1) subjecting an aluminium alkoxide compound and water to a reaction in the presence of an organic solvent, adding a Y-type molecular sieve during the reaction, controlling the pH value of the system to 1 to 6, and carrying out filtering after the reaction is completed to obtain a filter cake; (2) adding the filter cake obtained in the step (1) into aluminium hydroxide based dry glue powder, uniform mixing the filter cake and the aluminium hydroxide based dry glue powder, and carrying out molding, drying and calcining, thereby obtaining a Y-type molecular sieve and aluminum oxide composite catalyst support; and (3) impregnating the composite catalyst support into an active-metal solution, and carrying out drying and calcining, thereby obtaining the catalyst. In the above-mentioned technology, through the mutual coordinating action between the Y-type molecular sieve and aluminium hydroxide, the finally-prepared catalyst facilitates approaching and cracking of macromolecular hydrocarbons, meanwhile, the production of carbon deposit can be reduced, and the carbon residue removing activity and stability of the catalyst can be improved. However, the catalyst prepared by the above-mentioned technology has a relatively small and relatively single pore size, the ratio of pores with a pore size of 6 nm to 15 nm accounts for 70% or more, thus, the catalyst has poor adsorption capacity to asphaltenes and colloids with high molecular weight, the asphaltenes and colloids are difficult in cracking, and thus, the yield of light oil products is relatively low; in addition, because the asphaltenes and colloids deposited on the catalyst can block up pore passages and cover active centers, the activity of the catalyst is lowered.

The composite hydrogenation catalyst subjected to a hydrogenation process is converted into a spent catalyst. Metals such as Fe, Ni, V and Ca in raw oil present in the form of soluble metal-organic compounds, the soluble metal-organic compounds can be decomposed and deposited to the surface and interior of the catalyst to block up micropores of the catalyst during hydrogenation catalysis, meanwhile, carbon can also be deposited to the surface and interior of the catalyst during hydrogenation catalysis and similarly blocks up the micropores of the catalyst and cover active centers of the metals, and finally, catalyst deactivation is caused.

Moreover, original active centers such as nickel and molybdenum in the spent catalyst all present in the form of sulfides, thus, the spent catalysts have inflammability and toxicity, belong to hazardous wastes and are required to be treated.

The conventional catalyst treatment flows are as follows: incinerating the spent catalyst, pulverizing the incinerated material into powder, carrying out oxidizing calcining, carrying out alkaline leaching to recover molybdenum and vanadium, carrying out acidic leaching to recover cobalt and nickel, and discharging waste residues. However, the flows have the following problems: (1) valuable metals such as molybdenum and nickel are incompletely recovered, and the recovery ratio is low; (2) the spent catalyst has an adsorbed oil content of 5% to 15%, oils are burnt and wasted during incinerating, and meanwhile, the environment is polluted; (3) sulfur of metal sulfides is oxidized during incinerating and oxidizing calcining and is converted into sulfur dioxide, and thus, the environment is polluted; and (4) treated waste residues still contain heavy-metal salts, and secondary pollution may be caused in case of long-term stacking and treatment.

A regeneration method for a heavy oil hydrotreating catalyst is disclosed by a Chinese Patent Document CN 102310005 A. Disclosed are the following steps: firstly, carrying out dry distillation on a deactivated heavy oil hydrotreating catalyst, then, carrying out washing by an acidic solution, and then, carrying out calcining decoking treatment, wherein the dry distillation is carried out at a temperature of 300 DEG C. to 550 DEG C., the acidic solution is a hydrochloric acid containing solution, the ratio of the amount of washing acid to the amount of the catalyst is 5 L/Kg to 50 L/Kg, and the acid concentration is 0.1 mol/L to 0.5 mol/L. Through the dry distillation, liquid hydrocarbons are obtained through subjecting part of coking substances to a dry distillation reaction while part of residual oil is recovered from the deactivated catalyst, so that the recovery ratio of valuable products is increased. Through organically integrating the steps such as carrying out dry distillation, carrying out acid pickling and carrying out calcining and proper conditions, the deactivated hydrotreating catalyst is excellently regenerated.

However, known through analysis, the technical scheme disclosed by the above-mentioned patent document has the following defects: (1) supports and active ingredients are not subjected to effective composite utilization in a recovery treatment process of spent hydrogenation catalysts; (2) metal impurities are removed through acid pickling, however, some metal impurities can serve as active metals of a follow-up hydrogenation process, thus, these metal impurities are not effectively utilized; and (3) through dry distillation, the liquid hydrocarbons are obtained through subjecting part of the coking substances to the dry distillation reaction, however, the remaining coking substances are not effectively utilized; and then, carbon deposit is removed through calcining, thus, the carbon deposit is not utilized.

SUMMARY

Therefore, one technical problem to be solved by the present invention is to overcome the defect in the prior art that supports of hydrogenation catalysts are single in pore size, and then provide a composite support which has uniformly-distributed multi-size pore sizes and is applied to a heavy-oil hydrogenation catalyst.

In order to solve the technical problem described above, a technical solution adopted by the present invention is as follows.

The present invention provides a catalyst composite support, comprising
a semi-coke pore-expanding material,
a molecular sieve and
a spent catalytic cracking catalyst,
wherein the mass ratio of the semi-coke pore-expanding material to the molecular sieve to the spent catalytic cracking catalyst is (1 to 5):(2 to 4):(0.5 to 5);
the semi-coke pore-expanding material has a specific surface area of 150 $m^2/g$ to 300 $m^2/g$ and an average pore size of 70 nm to 80 nm;
the molecular sieve has a specific surface area of 200 $m^2/g$ to 300 $m^2/g$ and an average pore size of 5 nm to 10 nm; and
the spent catalytic cracking catalyst has a specific surface area of 50 $m^2/g$ to 300 $m^2/g$ and an average pore size of 3 nm to 7 nm.

Further, the semi-coke pore-expanding material has an average particle size of 60 to 100 microns and an average pore volume of 2 $cm^3/g$ to 3 $cm^3/g$.

Further, the molecular sieve has an average particle size of 1 mm to 4 mm.

Further, the spent catalytic cracking catalyst has an average particle size of no greater than 150 microns.

Further, on the basis of the mass of the spent catalytic cracking catalyst, the spent catalytic cracking catalyst comprises the following ingredients in parts by mass:
Y-type molecular sieve 15-55 parts;
aluminum oxide 15-55 parts; and
at least one of nickel, vanadium and ferrum 0.5-1 part.

Further, the spent catalytic cracking catalyst has an average particle size of no greater than 100 microns to 150 microns and a specific surface area of 200 $m^2/g$ to 300 $m^2/g$.

The present invention further provides a preparation method for the catalyst composite support, comprising the following steps:
(S1) mixing the semi-coke pore-expanding material, the molecular sieve and the spent catalytic cracking catalyst, followed by molding to obtain a molded material;

(S2) calcining the molded material in an oxygen-free condition to obtain a calcined material; and
(S3) activating the calcined material with a gas to obtain the catalyst composite support.
Further, the step (S1) further comprises the step of
separately grinding the semi-coke pore-expanding material, the molecular sieve and the spent catalytic cracking catalyst prior to mixing, or
grinding the molded material obtained by mixing the semi-coke pore-expanding material, the molecular sieve and the spent catalytic cracking catalyst.

Further, the spent catalytic cracking catalyst is a deactivated catalyst in a catalytic-cracking hydrogenation process for a heavy oil feedstock.

Further, the calcining is carried out at a temperature of 650 DEG C. to 750 DEG C. for a period of 1.5 to 2.5 hours.

Further, in the step (S3), the gas is an oxidizing gas such as water vapor; and
the activating is carried out at a temperature of 900 DEG C. to 950 DEG C. for a period of 1.5 to 2 hours.

Further, the step (S3) further comprises the step of grinding the catalyst composite support until the grain size of the ground catalyst composite support is 2 to 200 microns.

In addition, the present invention provides a hydrogenation catalyst, comprising the catalyst composite support, and an active metal oxide loaded onto the catalyst composite support.

Further, the active metal oxide is selected from VIII metal oxide, VIB metal oxide, or a mixture thereof;
the mass ratio of the composite support to active metals in the active metal oxide is 100:(0.5 to 10); and
the mass ratio of the VIII metal oxide to the VIB metal oxide is (1 to 20):(0.5 to 10).

Moreover, the present invention further provides a preparation method for the hydrogenation catalyst, comprising the following steps:
(1) impregnating the composite support in a metal precursor solution of the active metal oxide in an isometrical manner;
(2) drying the impregnated composite support at a temperature of 90 DEG C. to 110 DEG C. for a period of 2 to 10 hours to obtain a dried matter;
(3) calcining the dried matter at a temperature of 400 DEG C. to 550 DEG C. for a period of 2 to 10 hours to obtain a calcined matter; and
(4) grinding the calcined matter until the grain size of the ground calcined matter is 0.1 to 100 microns, thereby obtaining the hydrogenation catalyst for heavy oil.

Further, in the step (4), the calcined matter is ground until the grain size of the ground calcined matter is 10 to 50 microns.

Besides, another technical problem to be solved by the present invention is to overcome the defect that the supports and active ingredients are not subjected to effective composite utilization in a recovery treatment process of the spent hydrogenation catalysts, and then provide a method for regenerating a spent hydrogenation catalyst. The method for regenerating the spent hydrogenation catalyst has the advantages that the steps are simple, the cost of investment is low, the supports and the active ingredients in the spent hydrogenation catalyst can be effectively utilized, regeneration of the spent hydrogenation catalyst is achieved, and the regenerated spent hydrogenation catalyst can be directly applied to a hydrogenation process.

In order to solve the technical problem described above, a technical solution adopted by the present invention is as follows.

A method for regenerating a spent hydrogenation catalyst, provided by the present invention, comprises the following steps:
(S1) carrying out dry distillation treatment on the spent hydrogenation catalyst to obtain a dehydrated and deoiled catalyst A and a dry distillation gas;
(S2) activating the catalyst A to obtain a catalyst B; and
(S3) grinding the catalyst B to obtain a regenerated hydrogenation catalyst.

The dry distillation treatment is carried out at a temperature of 400 DEG C. to 800 DEG C. for a period of 2 to 2.5 hours.

Further, the dry distillation treatment is carried out at a temperature of 600 DEG C. to 800 DEG C. for a period of 2 to 2.5 hours.

The activating is carried out at a temperature of 850 DEG C. to 950 DEG C. for a period of 0.5 to 2 hours.

Further, the activating is carried out at a temperature of 900 DEG C. to 950 DEG C. for a period of 0.5 to 1 hour.

Further, water vapor is used as an activator in the activating.

In the step (S3), the catalyst B is ground until the grain size of the ground catalyst B is 20 to 200 microns.

Further, in the step (S3), the catalyst B is ground until the grain size of the ground catalyst B is 20 to 50 microns.

The spent hydrogenation catalyst is obtained through carrying out solid-liquid separation on a liquid mixture of a spent catalyst and a heavy oil product discharged from the bottom of a vacuum distillation tower after suspended-bed hydrogenation of a heavy oil feedstock.

Further, the method further comprises the steps of:
carrying out dust removal on the dry distillation gas to obtain a dust and a dedusted dry distillation gas,
mixing the dust with the catalyst A,
cooling the dedusted dry distillation gas to obtain a high-boiling-point oil-water mixture and a combustible low-boiling-point gas, and
subjecting the high-boiling-point oil-water mixture to oil-water separation, thereby obtaining crude product oil and oil-containing wastewater.

Further, the method further comprises the step of mixing the regenerated hydrogenation catalyst and a new hydrogenation catalyst according to a mass ratio of (2 to 7):10 to form a mixed hydrogenation catalyst.

Further, the spent hydrogenation catalyst is a spent catalyst generated after the hydrogenation catalyst is subjected to a hydrogenation process.

Compared with the prior art, the suspended-bed hydrogenation catalyst and the regeneration method therefor have the following beneficial effects.

(1) According to the catalyst composite support provided by the embodiments of the present invention, the catalyst composite support is obtained through regulating and controlling the mass ratio of the semi-coke pore-expanding material, the molecular sieve and the spent catalytic cracking catalyst which are of different pore sizes and specific surface areas. The support has uniformly-distributed pore sizes of different sizes and contains 50% to 60% (by volume) of macropores, 20% to 30% (by volume) of mesopores and the balance of micropores. By the support, the defect that the existing catalyst composite supports are single in pore sizes is overcome.

(2) According to the catalyst composite support provided by the embodiments of the present invention, the semi-coke pore-expanding material with L weakly-acidic centers, the molecular sieve and the spent catalytic cracking catalyst are selected, and the semi-coke pore-expanding material is used for effectively adsorbing colloids, asphaltenes and metal impurities; and macromolecules such as the colloids and the asphaltenes in heavy oil are cracked through the L weakly-acidic centers in the composite support and are prevented from being coked onto the composite support. At the same time, metals (such as V) deposited onto the spent catalytic cracking catalyst can be converted into active metals in a follow-up hydrogenation catalyzing process, so that the deposited metals are sufficiently utilized, and the conversion ratio of the heavy oil is further increased.

(3) According to the composite support provided by the embodiments of the present invention, through defining the mass ratio of the semi-coke pore-expanding material to the molecular sieve to the spent catalytic cracking catalyst, the forming of a macropore (greater than 50 nm), mesopore (from 2 nm to 50 nm) and micropore (smaller than 2 nm) uniformly distributed structure is facilitated, and shown by measurement through the international standard ISO 15901, the composite support contains 50% to 60% (by volume) of macropores, 20% to 30% (by volume) of mesopores and the balance of micropores.

(4) According to the preparation method for the composite support, provided by the embodiments of the present invention, through mixing the semi-coke pore-expanding material, the molecular sieve and the spent catalytic cracking catalyst, followed by molding, the same substances are not prone to agglomeration in a follow-up calcining process, and then, the semi-coke pore-expanding material, the molecular sieve and the spent catalytic cracking catalyst can keep a uniform dispersed state, so that pore sizes of all the support materials are matched with one another, adsorption of various substances such as asphaltenes and colloids in the heavy oil during hydrotreating is facilitated, the various substances can be in effective contact with active ingredients, and then, the conversion ratio of the heavy oil and the yield of light oil are increased. Moreover, in the calcining step, impurities such as the asphaltenes and the colloids in the spent catalytic cracking catalyst can be coked. Finally, the calcined material is activated, so that coking substances in the calcined material are activated into porous materials, so that the influence on the loading performance of the composite support caused by the coking substances is avoided; and meanwhile, pore sizes of the composite support are subjected to reforming and dredging, so that a macropore, mesopore and micropore uniformly distributed structure is formed. Due to the structure, all active ingredients can be loaded to the composite support, and meanwhile, the effective contact between all ingredients in the heavy oil and the active ingredients during hydrogenation is also facilitated, so that the conversion ratio of the heavy oil is increased.

(5) According to the hydrogenation catalyst provided by the embodiments of the present invention, through adopting the composite support, the hydrogenation catalyst which has uniformly-distributed multi-level pore sizes and uniformly-loaded active ingredients is obtained. The probability of contact between all ingredients in the heavy oil and active ingredients in the hydrogenation catalyst during hydrogenation is increased due to the hydrogenation catalyst, particularly, coking substances such as the asphaltenes can be catalytically cracked effectively, the destruction to the hydrogenation catalyst caused by the coking substances is avoided, and the service life of the hydrogenation catalyst is prolonged. At the same time, the conversion ratio of the heavy oil is increased.

(6) The hydrogenation catalyst provided by the embodiments of the present invention integrates adsorption, cracking and hydrogenation properties, so that the problem that the content of impurities and metals in the heavy oil is high can be effectively solved, the coking of substances prone to coking is prevented, and meanwhile, the yield of light oil in a suspended-bed hydrogenation process is increased.

(7) According to the preparation method for the hydrogenation catalyst, provided by the embodiments of the present invention, the hydrogenation catalyst for heavy oil is obtained through impregnating the composite support in the metal precursor solution in an isometrical manner, and then, carrying out drying, calcining and grinding, and the finally prepared hydrogenation catalyst has a multi-level pore size structure, the problem that the content of impurities and metals in the heavy oil is high can be effectively solved, the coking of substances prone to coking is prevented, and meanwhile, the yield of light oil in a suspended-bed hydrogenation process is increased.

(8) According to the method for regenerating the spent hydrogenation catalyst, provided by the embodiments of the present invention, the regenerated hydrogenation catalyst can be prepared through carrying out dry distillation treatment on the spent hydrogenation catalyst, and carrying out activating treatment and grinding treatment, can be directly applied to a suspended-bed hydrogenation process and can also be applied to the suspended-bed hydrogenation process after being mixed with a new hydrogenation catalyst. According to the method, acidic solution washing and calcining decoking treatment are not required, dry distillation and activating treatment are directly used, and the effective composite utilization of the support and active ingredients is achieved; and the loading performance of the active-metal-loaded support in the waste hydrogenation catalyst cannot be destroyed, and thus, the catalytic hydrogenation performance of the support and active metals loaded onto the support in the spent hydrogenation catalyst in the suspended-bed hydrogenation process is guaranteed.

(9) According to the method for regenerating the spent hydrogenation catalyst, provided by the embodiments of the present invention, firstly, the waste hydrogenation catalyst is converted into the dehydrated and deoiled catalyst A and the dry distillation gas through dry distillation treatment, and metals deposited to the surface and interior of the spent hydrogenation catalyst can be activated by the dry distillation treatment, such as metal fluidization, so that the catalytic performance of the follow-up regenerated hydrogenation catalyst is improved; moreover, substances, which are prone to coking, (such as carbon) and deposited to the surface and interior of the spent hydrogenation catalyst can be coked and agglomerated by the dry distillation treatment, so that the follow-up forming of porous materials through activating the coking substances is facilitated, the blockage of micropores is avoided, meanwhile, the adsorption characteristic of the porous materials is exerted, and active metals are better adsorbed;

then, the catalyst B is obtained through activating the catalyst A obtained after the dry distillation treatment, the catalyst A is subjected to pore expanding through activating, the coking substances obtained after dry distillation are activated into the porous materials, and the internal pore size structure of the entire catalyst B is optimized through the porous materials and the pore-expanded catalyst A, so that the exerting of catalytic action of the active metals in the hydrogenation catalyst is facilitated; through limiting the temperature of activating to 850 DEG C. to 950 DEG C. and the time of activating to 0.5 to 2 hours, the temperature and time ranges are appropriate, the catalyst A can be effectively activated, the combined action of the support and active ingredients is exerted, and meanwhile, the active metals in the follow-up regenerated hydrogenation catalyst can present in a fluidized form; and finally, the regenerated hydrogenation catalyst is prepared through grinding the catalyst B into powder with a grain size of 20 to 200 microns and can be directly applied to the suspended-bed hydrogenation process.

(10) According to the method for regenerating the spent hydrogenation catalyst, provided by the embodiments of the present invention, the dehydrated and deoiled catalyst A and the dry distillation gas are finally obtained through guaranteeing that the dry distillation is carried out at a temperature of 400 DEG C. to 800 DEG C. for a period of 2 to 2.5 hours; and more importantly, by controlling the coking degree of substances which are prone to coking and deposited to the surface and interior of the waste hydrogenation catalyst, the condition that the follow-up activating of the substances prone to coking is not facilitated due to low coking degree, or due to high coking degree, the substances prone to coking are agglomerated and cause damage to the support of the hydrogenation catalyst, micropores of the support are broken and collapsed, and the loading performance of the support is affected is avoided.

(11) According to the method for regenerating the spent hydrogenation catalyst, provided by the embodiments of the present invention, the continuous use of the hydrogenation catalyst can be achieved, the utilization efficiency of the spent hydrogenation catalyst is increased, and the pollution to environments caused by the emission or recovery of the spent hydrogenation catalyst is reduced from the source, so that the method has great environment-friendly and economic values.

DETAILED DESCRIPTION

In order to better illustrate objects, technical solutions and advantages of the present invention, the present invention will be further described in conjunction with specific embodiments. The present invention may be implemented in many different forms and should not be construed as limited to the embodiments set forth herein. Rather, these embodiments are provided so that this disclosure will be thorough and complete, and will fully convey the concept of the present invention to those skilled in the art, the present invention being limited only by the claims.

Suspended-bed hydrogenation catalysts used in following embodiments 6 to 11 and comparative examples 6 to 10 may be catalysts commonly used for suspended-bed hydrogenation, which are commonly known to those skilled in the art, such as molybdenum-cobalt-nickel-aluminum oxide suspended-bed hydrogenation catalysts, and the suspended-bed hydrogenation catalysts used in the following embodiments 6 to 11 and comparative examples 6 to 10 specifically may be suspended-bed hydrogenation catalysts HS-1 purchased from Beijing Sanju Environmental Protection & New Materials Co., Ltd.

Embodiment 1

The embodiment provides a composite support and a hydrogenation catalyst using the composite support and used for heavy oil.

A preparation method for the composite support comprises the following steps:

S1. mixing 1 g of semi-coke pore-expanding material, 4 g of molecular sieve and 0.5 g of spent catalytic cracking catalyst, followed by grinding and molding to obtain a molded material, wherein the semi-coke pore-expanding material is obtained through mixing semi-coke and sodium carbonate according to a mass ratio of 1:2, then, activating the obtained mixture for a period of 0.5 hour by using water vapor at a temperature of 900 DEG C., then, subjecting a pore-expanded sample to acid pickling, carrying out water washing, then, carrying out centrifugal separation, and carrying out drying for a period of 3 hours at a temperature of 100 DEG C., and has an average particle size of 60 microns, a specific surface area of 300 m$^2$/g, an average pore size of 70 nm and an average pore volume of 3 cm$^3$/g;

the molecular sieve is a Y-type molecular sieve and has an average particle size of 1 mm, a specific surface area of 300 m$^2$/g and an average pore size of 5 nm; and the spent catalytic cracking catalyst comprises the Y-type molecular sieve, aluminum oxide and nickel-vanadium-and-ferrum, which are in the mass ratio of 15:55:0.5, and the spent catalytic cracking catalyst has an average particle size of 150 microns, a specific surface area of 300 m$^2$/g and an average pore size of 3 nm;

S2. calcining the molded material for a period of 2.5 hours at a temperature of 650 DEG C. in a nitrogen gas atmosphere to obtain a calcined material;

S3. activating the calcined material for a period of 1.5 hours at a temperature of 950 DEG C. to obtain an activated material; and S4. grinding the activated material until the grain size of the ground activated material is 2 microns, thereby obtaining the composite support, wherein shown by measurement through the international standard ISO 15901, the composite support contains 60% (by volume) of macropores, 30% (by volume) of mesopores and the balance of micropores.

The hydrogenation catalyst for heavy oil is composed of the composite support and an active metal oxide loaded onto the composite support, wherein the mass ratio of the composite support to active metals in the active metal oxide is 10:1.

A preparation method for the hydrogenation catalyst for heavy oil comprises the following steps:

(1) impregnating the composite support in a mixed aqueous solution of ammonium molybdate, nickel nitrate, cobalt sulfate and ferric sulfate for a period of 10 hours in an isometrical manner, wherein the condition that the mass ratio of the composite support to active metals is 10:1 and the mass ratio of oxides of nickel, cobalt and ferrum to oxides of molybdenum is 1:5 is guaranteed;

(2) drying the impregnated composite support for a period of 2 hours at a temperature of 110 DEG C. to obtain a dried matter;

(3) calcining the dried matter for a period of 10 hours at a temperature of 400 DEG C. to obtain a calcined matter; and (4) grinding the calcined matter until the grain size of the ground calcined matter is 10 microns, thereby obtaining the hydrogenation catalyst for heavy oil.

Embodiment 2

The embodiment provides a composite support and a hydrogenation catalyst using the composite support and used for heavy oil.

A preparation method for the composite support comprises the following steps:

S1. mixing 5 g of semi-coke pore-expanding material, 2 g of molecular sieve and 5 g of spent catalytic cracking catalyst, followed by grinding and molding to obtain a molded material, wherein the semi-coke pore-expanding material is obtained through mixing semi-coke and sodium carbonate according to a mass ratio of 1:6, then, activating the obtained mixture for a period of 0.5 hour by using water vapor at a temperature of 950 DEG C., then, subjecting a pore-expanded sample to acid pickling, carrying out water washing, then, carrying out centrifugal separation, and carrying out drying for a period of 3 hours at a temperature of 150 DEG C., and has an average particle size of 100 microns, a specific surface area of 150 m$^2$/g, an average pore size of 80 nm and an average pore volume of 2 cm$^3$/g;

the molecular sieve is a Y-type molecular sieve and has an average particle size of 2 mm, a specific surface area of 200 m$^2$/g and an average pore size of 6 nm; and the spent catalytic cracking catalyst comprises the Y-type molecular sieve, aluminum oxide and nickel-vanadium-and-ferrum, which are in the mass ratio of 55:15:1, and the spent catalytic cracking catalyst has an average particle size of 120 microns, a specific surface area of 200 m$^2$/g and an average pore size of 5 nm;

S2. calcining the molded material for a period of 1.5 hours at a temperature of 750 DEG C. in a nitrogen gas atmosphere to obtain a calcined material;

S3. activating the calcined material for a period of 2 hours by using water vapor at a temperature of 900 DEG C. to obtain an activated material; and S4. grinding the activated material until the grain size of the ground activated material is 10 microns, thereby obtaining the composite support, wherein shown by measurement through the international standard ISO 15901, the composite support contains 55% (by volume) of macropores, 20% (by volume) of mesopores and the balance of micropores.

The hydrogenation catalyst for heavy oil is composed of the composite support and an active metal oxide loaded onto the composite support, wherein the mass ratio of the composite support to active metals in the active metal oxide is 20:1.

A preparation method for the hydrogenation catalyst for heavy oil comprises the following steps:

(1) impregnating the composite support in a mixed aqueous solution of metatungstic acid, nickel sulfate, cobalt nitrate and ferric nitrate for a period of 10 hours in an isometrical manner, wherein the condition that the mass ratio of the composite support to active metals is 20:1 and the mass ratio of oxides of nickel, cobalt and ferrum to oxides of tungsten is 1:10 is guaranteed;

(2) drying the impregnated composite support for a period of 10 hours at a temperature of 90 DEG C. to obtain a dried matter;

(3) calcining the dried matter for a period of 2 hours at a temperature of 550 DEG C. to obtain a calcined matter; and (4) grinding the calcined matter until the grain size of the ground calcined matter is 20 microns, thereby obtaining the hydrogenation catalyst for heavy oil.

Embodiment 3

The embodiment provides a composite support and a hydrogenation catalyst using the composite support and used for heavy oil.

A preparation method for the composite support comprises the following steps:

S1. mixing 3 g of semi-coke pore-expanding material, 2 g of molecular sieve and 3 g of spent catalytic cracking catalyst, followed by grinding and molding to obtain a molded material, wherein the semi-coke pore-expanding material is obtained through mixing semi-coke and sodium carbonate according to a mass ratio of 1:4, then, activating the obtained mixture for a period of 0.5 hour by using water vapor at a temperature of 920 DEG C., then, subjecting a pore-expanded sample to acid pickling, carrying out water washing, then, carrying out centrifugal separation, and carrying out drying for a period of 3 hours at a temperature of 120 DEG C., and has an average particle size of 80 microns, a specific surface area of 200 m$^2$/g, an average pore size of 75 nm and an average pore volume of 2.5 cm$^3$/g;

the molecular sieve is a Y-type molecular sieve and has an average particle size of 3 mm, a specific surface area of 250 m$^2$/g and an average pore size of 8 nm; and the spent catalytic cracking catalyst comprises the Y-type molecular sieve, aluminum oxide and nickel-vanadium-and-ferrum, which are in the mass ratio of 20:55:0.5, and the spent catalytic cracking catalyst has an average particle size of 100 microns, a specific surface area of 250 m$^2$/g and an average pore size of 6 nm;

S2. calcining the molded material for a period of 2 hours at a temperature of 700 DEG C. in a nitrogen gas atmosphere to obtain a calcined material;

S3. activating the calcined material for a period of 1.8 hours by using water vapor at a temperature of 920 DEG C. to obtain an activated material; and S4. grinding the activated material until the grain size of the ground activated material is 50 microns, thereby obtaining the composite support, wherein shown by measurement through the international standard ISO 15901, the composite support contains 60% (by volume) of macropores, 25% (by volume) of mesopores and the balance of micropores.

The hydrogenation catalyst for heavy oil is composed of the composite support and an active metal oxide loaded onto the composite support, wherein the mass ratio of the composite support to active metals in the active metal oxide is 100:0.5.

A preparation method for the hydrogenation catalyst for heavy oil comprises the following steps:

(1) impregnating the composite support in a mixed aqueous solution of metatungstic acid, nickel nitrate, cobalt nitrate and ferric nitrate for a period of 10 hours in an isometrical manner, wherein the condition that the mass ratio of the composite support to active metals is 100:0.5 and the mass ratio of oxides of nickel, cobalt and ferrum to oxides of tungsten is 2:1 is guaranteed;

(2) drying the impregnated composite support for a period of 8 hours at a temperature of 100 DEG C. to obtain a dried matter;

(3) calcining the dried matter for a period of 5 hours at a temperature of 450 DEG C. to obtain a calcined matter; and (4) grinding the calcined matter until the grain size of the ground calcined matter is 50 microns, thereby obtaining the hydrogenation catalyst for heavy oil.

Embodiment 4

The embodiment provides a composite support and a hydrogenation catalyst using the composite support and used for heavy oil.

A preparation method for the composite support comprises the following steps:

S1. mixing 4 g of semi-coke pore-expanding material, 2 g of molecular sieve and 0.5 g of spent catalytic cracking catalyst, followed by grinding and molding to obtain a molded material, wherein the semi-coke pore-expanding material is obtained through mixing semi-coke and sodium carbonate according to a mass ratio of 1:3, then, activating the obtained mixture for a period of 0.5 hour by using water vapor at a temperature of 910 DEG C., then, subjecting a pore-expanded sample to acid pickling, carrying out water washing, then, carrying out centrifugal separation, and carrying out drying for a period of 3 hours at a temperature of 130 DEG C., and has an average particle size of 90 microns, a specific surface area of 250 m$^2$/g, an average pore size of 80 nm and an average pore volume of 3 cm$^3$/g;

the molecular sieve is a ZSM-5 molecular sieve and has an average particle size of 4 mm, a specific surface area of 300 m$^2$/g, an average pore size of 10 nm and an average pore volume of 0.23%;

the spent catalytic cracking catalyst comprises the Y-type molecular sieve, aluminum oxide and nickel-vanadium-and-ferrum, which are in the mass ratio of 20:40:1, and the spent catalytic cracking catalyst has an average particle size of 150 microns, a specific surface area of 300 m$^2$/g and an average pore size of 7 nm;

S2. calcining the molded material for a period of 2 hours at a temperature of 750 DEG C. in a nitrogen gas atmosphere to obtain a calcined material;

S3. activating the calcined material for a period of 2 hours by using water vapor at a temperature of 920 DEG C. to obtain an activated material; and S4. grinding the activated material until the grain size of the ground activated material is 50 microns, thereby obtaining the composite support, wherein shown by measurement through the international standard ISO 15901, the composite support contains 62% (by volume) of macropores, 26% (by volume) of mesopores and the balance of micropores.

The hydrogenation catalyst for heavy oil is composed of the composite support and an active metal oxide loaded onto the composite support, wherein the mass ratio of the composite support to active metals in the active metal oxide is 10:1.

A preparation method for the hydrogenation catalyst for heavy oil comprises the following steps:

(1) impregnating the composite support in a mixed aqueous solution of ammonium molybdate, nickel sulfate, cobalt sulfate and ferric sulfate for a period of 10 hours in an isometrical manner, wherein the condition that the mass ratio of the composite support to active metals is 10:1 and the mass ratio of oxides of nickel, cobalt and ferrum to oxides of molybdenum is 10:1 is guaranteed;

(2) drying the impregnated composite support for a period of 2 hours at a temperature of 100 DEG C. to obtain a dried matter;

(3) calcining the dried matter for a period of 10 hours at a temperature of 400 DEG C. to obtain a calcined matter; and (4) grinding the calcined matter until the grain size of the ground calcined matter is 50 microns, thereby obtaining the hydrogenation catalyst for heavy oil.

Embodiment 5

The embodiment provides a composite support and a hydrogenation catalyst using the composite support and used for heavy oil.

A preparation method for the composite support comprises the following steps:

S1. mixing 3 g of semi-coke pore-expanding material, 2 g of molecular sieve and 3 g of spent catalytic cracking catalyst, followed by grinding and molding to obtain a molded material, wherein the semi-coke pore-expanding material is obtained through mixing semi-coke and sodium carbonate according to a mass ratio of 1:4, then, activating the obtained mixture for a period of 0.5 hour by using water vapor at a temperature of 920 DEG C., then, subjecting a pore-expanded sample to acid pickling, carrying out water washing, then, carrying out centrifugal separation, and carrying out drying for a period of 3 hours at a temperature of 120 DEG C., and has an average particle size of 80 microns, a specific surface area of 200 m$^2$/g, an average pore size of 75 nm and an average pore volume of 2.5 cm$^3$/g;

the molecular sieve is a Beta molecular sieve and has an average particle size of 2.5 mm, a specific surface area of 280 m$^2$/g and an average pore size of 6 nm; and the spent catalytic cracking catalyst comprises the Y-type molecular sieve, aluminum oxide and nickel-vanadium-and-ferrum, which are in the mass ratio of 20:55:0.5, and the spent catalytic cracking catalyst has an average particle size of 100 microns, a specific surface area of 250 m$^2$/g and an average pore size of 4 nm;

S2. calcining the molded material for a period of 2 hours at a temperature of 700 DEG C. in a nitrogen gas atmosphere to obtain a calcined material;

S3. activating the calcined material for a period of 1.8 hours by using water vapor at a temperature of 920 DEG C. to obtain an activated material; and S4. grinding the activated material until the grain size of the ground activated material is 50 microns, thereby obtaining the composite support, wherein shown by measurement through the international standard ISO 15901, the composite support contains 60% (by volume) of macropores, 25% (by volume) of mesopores and the balance of micropores.

The hydrogenation catalyst for heavy oil is composed of the composite support and an active metal oxide loaded onto the composite support, wherein the mass ratio of the composite support to active metals in the active metal oxide is 100:0.5.

A preparation method for the hydrogenation catalyst for heavy oil comprises the following steps:

(1) impregnating the composite support in a mixed aqueous solution of metatungstic acid, nickel nitrate, cobalt nitrate and ferric nitrate for a period of 10 hours in an isometrical manner, wherein the condition that the mass ratio of the composite support to active metals is 100:0.5 and the mass ratio of oxides of nickel, cobalt and ferrum to oxides of molybdenum is 2:1 is guaranteed;

(2) drying the impregnated composite support for a period of 8 hours at a temperature of 100 DEG C. to obtain a dried matter;

(3) calcining the dried matter for a period of 5 hours at a temperature of 450 DEG C. to obtain a calcined matter; and (4) grinding the calcined matter until the grain size of the ground calcined matter is 50 microns, thereby obtaining the hydrogenation catalyst for heavy oil.

Embodiment 6

A method for regenerating a spent hydrogenation catalyst, provided by the embodiment, comprises the following steps:

S1. carrying out solid-liquid separation on a liquid mixture of a spent catalyst and a heavy oil product discharged from the bottom of a vacuum distillation tower after a heavy oil feedstock and high-temperature coal tar are subjected to a suspended-bed hydrogenation process under the action of a suspended-bed hydrogenation catalyst, by adopting an automatic back-purged filter, to obtain a filter cake, i.e., the spent hydrogenation catalyst;

S2. subjecting the spent hydrogenation catalyst to dry distillation treatment for a period of 2.2 hours at a temperature of 600 DEG C. to obtain a dehydrated and deoiled catalyst A and a dry distillation gas, then, carrying out dust removal on the dry distillation gas to obtain a dust and a dedusted dry distillation gas, mixing the obtained dust with the catalyst A, cooling the dedusted dry distillation gas to obtain a high-boiling-point oil-water mixture and a combustible low-boiling-point gas, subjecting the high-boiling-point oil-water mixture to oil-water separation to obtain crude product oil and oil-containing wastewater, subjecting the combustible low-boiling-point gas to filtering to obtain a clean combustible gas, and storing the combustible gas for later use;

S3. activating the dehydrated and deoiled catalyst A for a period of 1 hour at a temperature of 900 DEG C. by using water vapor to obtain a catalyst B; and S4. grinding the catalyst B until the grain size of the ground catalyst B is 20 microns, thereby obtaining a regenerated hydrogenation catalyst.

Embodiment 7

A method for regenerating a spent hydrogenation catalyst, provided by the embodiment, comprises the following steps:

S1. carrying out solid-liquid separation on a liquid mixture of a spent catalyst and a heavy oil product discharged from the bottom of a vacuum distillation tower after a heavy oil feedstock and normal-pressure residual oil are subjected to a suspended-bed hydrogenation process under the action of a suspended-bed hydrogenation catalyst, by adopting a plate-and-frame filter, to obtain filter residue, i.e., the spent hydrogenation catalyst;

S2. subjecting the spent hydrogenation catalyst to dry distillation treatment for a period of 2.1 hours at a temperature of 700 DEG C. to obtain a dehydrated and deoiled catalyst A and a dry distillation gas, then, carrying out dust removal on the dry distillation gas to obtain a dust and a dedusted dry distillation gas, mixing the obtained dust with the catalyst A, cooling the dedusted dry distillation gas to obtain a high-boiling-point oil-water mixture and a combustible low-boiling-point gas, subjecting the high-boiling-point oil-water mixture to oil-water separation to obtain crude product oil and oil-containing wastewater, subjecting the combustible low-boiling-point gas to filtering to obtain a clean combustible gas, and storing the combustible gas for later use;

S3. activating the dehydrated and deoiled catalyst A for a period of 0.5 hour at a temperature of 950 DEG C. by using water vapor to obtain a catalyst B; and S4. grinding the catalyst B until the grain size of the ground catalyst B is 50 microns, thereby obtaining a regenerated hydrogenation catalyst.

Embodiment 8

A method for regenerating a spent hydrogenation catalyst, provided by the embodiment, comprises the following steps:

S1. carrying out centrifugal separation on a liquid mixture of a spent catalyst and a heavy oil product discharged from the bottom of a vacuum distillation tower after a heavy oil feedstock and a mixture of medium-/low-temperature coal tar and asphalt are subjected to a suspended-bed hydrogenation process under the action of a suspended-bed hydrogenation catalyst, by adopting a centrifugal separator, to obtain solid residue, i.e., the spent hydrogenation catalyst;

S2. subjecting the spent hydrogenation catalyst to dry distillation treatment for a period of 2.5 hours at a temperature of 400 DEG C. to obtain a dehydrated and deoiled catalyst A and a dry distillation gas, then, carrying out dust removal on the dry distillation gas to obtain a dust and a dedusted dry distillation gas, mixing the obtained dust with the catalyst A, cooling the dedusted dry distillation gas to obtain a high-boiling-point oil-water mixture and a combustible low-boiling-point gas, subjecting the high-boiling-point oil-water mixture to oil-water separation to obtain crude product oil and oil-containing wastewater, subjecting the combustible low-boiling-point gas to filtering to obtain a clean combustible gas, and storing the combustible gas for later use;

S3. activating the dehydrated and deoiled catalyst A for a period of 2 hours at a temperature of 850 DEG C. by using water vapor to obtain a catalyst B; and S4. grinding the catalyst B until the grain size of the ground catalyst B is 100 microns, thereby obtaining a regenerated hydrogenation catalyst.

Embodiment 9

A method for regenerating a spent hydrogenation catalyst, provided by the embodiment, comprises the following steps:

S1. carrying out centrifugal separation on a liquid mixture of a spent catalyst and a heavy oil product discharged from the bottom of a vacuum distillation tower after a heavy oil feedstock and a mixture of medium-/low-temperature coal tar and vacuum residue are subjected to a suspended-bed hydrogenation process under the action of a suspended-bed hydrogenation catalyst, by adopting a centrifugal separator, to obtain solid residue, i.e., the spent hydrogenation catalyst;

S2. subjecting the spent hydrogenation catalyst to dry distillation treatment for a period of 2.4 hours at a temperature of 500 DEG C. to obtain a dehydrated and deoiled catalyst A and a dry distillation gas, then, carrying out dust removal on the dry distillation gas to obtain a dust and a dedusted dry distillation gas, mixing the obtained dust with the catalyst A, cooling the dedusted dry distillation gas to obtain a high-boiling-point oil-water mixture and a combustible low-boiling-point gas, subjecting the high-boiling-point oil-water mixture to oil-water separation to obtain crude product oil and oil-containing wastewater, subjecting the combustible low-boiling-point gas to filtering to obtain a clean combustible gas, and storing the combustible gas for later use;

S3. activating the dehydrated and deoiled catalyst A for a period of 1.5 hours at a temperature of 920 DEG C. by using water vapor to obtain a catalyst B; and S4. grinding the catalyst B until the grain size of the ground catalyst B is 150 microns, thereby obtaining a regenerated hydrogenation catalyst.

Embodiment 10

A method for regenerating a spent hydrogenation catalyst, provided by the embodiment, comprises the following steps:

S1. carrying out solid-liquid separation on a liquid mixture of a spent catalyst and a heavy oil product discharged from the bottom of a vacuum distillation tower after a heavy oil feedstock and medium-/low-temperature coal tar are subjected to a suspended-bed hydrogenation process under the action of a suspended-bed hydrogenation catalyst, by adopting a plate-and-frame filter, to obtain filter residue, i.e., the spent hydrogenation catalyst;

S2. subjecting the spent hydrogenation catalyst to dry distillation treatment for a period of 2.2 hours at a temperature of 550 DEG C. to obtain a dehydrated and deoiled catalyst A and a dry distillation gas, then, carrying out dust removal on the dry distillation gas to obtain a dust and a dedusted dry distillation gas, mixing the obtained dust with the catalyst A, cooling the dedusted dry distillation gas to obtain a high-boiling-point oil-water mixture and a combustible low-boiling-point gas, subjecting the high-boiling-point oil-water mixture to oil-water separation to obtain crude product oil and oil-containing wastewater, subjecting the combustible low-boiling-point gas to filtering to obtain a clean combustible gas, and storing the combustible gas for later use;

S3. activating the dehydrated and deoiled catalyst A for a period of 1 hour at a temperature of 930 DEG C. by using water vapor to obtain a catalyst B; and S4. grinding the catalyst B until the grain size of the ground catalyst B is 200 microns, thereby obtaining a regenerated hydrogenation catalyst.

Embodiment 11

A method for regenerating a spent hydrogenation catalyst, provided by the embodiment, comprises the following steps:

S1. carrying out solid-liquid separation on a liquid mixture of a spent catalyst and a heavy oil product discharged from the bottom of a vacuum distillation tower after a heavy oil feedstock and a mixture of medium-/low-temperature coal tar and high-temperature coal tar are subjected to a suspended-bed hydrogenation process under the action of a suspended-bed hydrogenation catalyst, by adopting a plate-and-frame filter, to obtain filter residue, i.e., the spent hydrogenation catalyst;

S2. subjecting the spent hydrogenation catalyst to dry distillation treatment for a period of 2.4 hours at a temperature of 700 DEG C. to obtain a dehydrated and deoiled catalyst A and a dry distillation gas, then, carrying out dust removal on the dry distillation gas to obtain a dust and a dedusted dry distillation gas, mixing the obtained dust with the catalyst A, cooling the dedusted dry distillation gas to obtain a high-boiling-point oil-water mixture and a combustible low-boiling-point gas, subjecting the high-boiling-point oil-water mixture to oil-water separation to obtain crude product oil and oil-containing wastewater, subjecting the combustible low-boiling-point gas to filtering to obtain a clean combustible gas, and storing the combustible gas for later use;

S3. activating the dehydrated and deoiled catalyst A for a period of 1 hour at a temperature of 910 DEG C. by using water vapor to obtain a catalyst B; and S4. grinding the catalyst B until the grain size of the ground catalyst B is 30 microns, thereby obtaining a regenerated hydrogenation catalyst.

Embodiment 12

A method for regenerating a spent hydrogenation catalyst, provided by the embodiment, comprises the following steps:

S1. carrying out solid-liquid separation on a liquid mixture of a spent catalyst and a heavy oil product discharged from the bottom of a vacuum distillation tower after a heavy oil feedstock and high-temperature coal tar are subjected to a suspended-bed hydrogenation process under the action of the hydrogenation catalyst for heavy oil, prepared in the embodiment 1, by adopting an automatic back-purged filter, to obtain a filter cake, i.e., the spent hydrogenation catalyst;

S2. subjecting the spent hydrogenation catalyst to dry distillation treatment for a period of 2.2 hours at a temperature of 600 DEG C. to obtain a dehydrated and deoiled catalyst A and a dry distillation gas, then, carrying out dust removal on the dry distillation gas to obtain a dust and a dedusted dry distillation gas, mixing the obtained dust with the catalyst A, cooling the dedusted dry distillation gas to obtain a high-boiling-point oil-water mixture and a combustible low-boiling-point gas, subjecting the high-boiling-point oil-water mixture to oil-water separation to obtain crude product oil and oil-containing wastewater, subjecting the combustible low-boiling-point gas to filtering to obtain a clean combustible gas, and storing the combustible gas for later use;

S3. activating the dehydrated and deoiled catalyst A for a period of 1 hour at a temperature of 900 DEG C. by using water vapor to obtain a catalyst B; and S4. grinding the catalyst B until the grain size of the ground catalyst B is 20 microns, thereby obtaining a regenerated hydrogenation catalyst.

Comparative Example 1

The comparative example provides a composite support and a hydrogenation catalyst using the composite support and used for heavy oil.

A preparation method for the composite support comprises the following steps:

S1. mixing 4 g of molecular sieve and 0.5 g of spent catalytic cracking catalyst, followed by grinding and molding to obtain a molded material, wherein the molecular sieve is a Y-type molecular sieve and has an average particle size of 1 mm, a specific surface area of 300 m$^2$/g and an average pore size of 5 nm; and the spent catalytic cracking catalyst comprises the Y-type molecular sieve, aluminum oxide and nickel-vanadium-and-ferrum, which are in the mass ratio of 15:55:0.5, and the spent catalytic cracking catalyst has an average particle size of 150 microns, a specific surface area of 300 m$^2$/g and an average pore size of 3 nm;

S2. calcining the molded material for a period of 2.5 hours at a temperature of 650 DEG C. in a nitrogen gas atmosphere to obtain a calcined material;

S3. activating the calcined material for a period of 1.5 hours by using water vapor at a temperature of 950 DEG C. to obtain an activated material; and S4. grinding the activated material until the grain size of the ground activated material is 2 microns, thereby obtaining the composite support, wherein shown by measurement through the international standard ISO 15901, the composite support contains 30% (by volume) of macropores, 20% (by volume) of mesopores and the balance of micropores.

The hydrogenation catalyst for heavy oil is composed of the composite support and an active metal oxide loaded onto the composite support, wherein the mass ratio of the composite support to active metals in the active metal oxide is 10:1.

A preparation method for the hydrogenation catalyst for heavy oil comprises the following steps:

(1) impregnating the composite support in a mixed aqueous solution of ammonium molybdate, nickel nitrate, cobalt sulfate and ferric sulfate for a period of 10 hours in an isometrical manner, wherein the condition that the mass ratio of the composite support to active metals is 10:1 and the mass ratio of oxides of nickel, cobalt and ferrum to oxides of molybdenum is 1:5 is guaranteed;

(2) drying the impregnated composite support for a period of 2 hours at a temperature of 110 DEG C. to obtain a dried matter;

(3) calcining the dried matter for a period of 10 hours at a temperature of 400 DEG C. to obtain a calcined matter; and (4) grinding the calcined matter until the grain size of the ground calcined matter is 10 microns, thereby obtaining the hydrogenation catalyst for heavy oil.

Comparative Example 2

The comparative example provides a composite support and a hydrogenation catalyst using the composite support and used for heavy oil.

A preparation method for the composite support comprises the following steps:

S1. mixing 5 g of semi-coke pore-expanding material and 2 g of molecular sieve, followed by grinding and molding to obtain a molded material, wherein the semi-coke pore-expanding material is obtained through mixing semi-coke and sodium carbonate according to a mass ratio of 1:6, then, activating the obtained mixture for a period of 0.5 hour by using water vapor at a temperature of 950 DEG C., then, subjecting a pore-expanded sample to acid pickling, carrying out water washing, then, carrying out centrifugal separation, and carrying out drying for a period of 3 hours at a temperature of 150 DEG C., and has an average particle size of 100 microns, a specific surface area of 150 m$^2$/g, an average pore size of 80 nm and an average pore volume of 2 cm$^3$/g;

the molecular sieve is a Y-type molecular sieve and has an average particle size of 2 mm, a specific surface area of 200 m$^2$/g and an average pore size of 6 nm;

S2. calcining the molded material for a period of 1.5 hours at a temperature of 750 DEG C. in a nitrogen gas atmosphere to obtain a calcined material;

S3. activating the calcined material for a period of 2 hours by using water vapor at a temperature of 900 DEG C. to obtain an activated material; and S4. grinding the activated material until the grain size of the ground activated material is 10 microns, thereby obtaining the composite support, wherein shown by measurement through the international standard ISO 15901, the composite support contains 40% (by volume) of macropores, 15% (by volume) of mesopores and the balance of micropores.

The hydrogenation catalyst for heavy oil is composed of the composite support and an active metal oxide loaded onto the composite support, wherein the mass ratio of the composite support to active metals in the active metal oxide is 20:1.

A preparation method for the hydrogenation catalyst for heavy oil comprises the following steps:

(1) impregnating the composite support in a mixed aqueous solution of metatungstic acid, nickel sulfate, cobalt nitrate and ferric nitrate for a period of 10 hours in an isometrical manner, wherein the condition that the mass ratio of the composite support to active metals is 20:1 and the mass ratio of oxides of nickel, cobalt and ferrum to oxides of tungsten is 1:10 is guaranteed;
(2) drying the impregnated composite support for a period of 10 hours at a temperature of 90 DEG C. to obtain a dried matter;
(3) calcining the dried matter for a period of 2 hours at a temperature of 550 DEG C. to obtain a calcined matter; and
(4) grinding the calcined matter until the grain size of the ground calcined matter is 20 microns, thereby obtaining the hydrogenation catalyst for heavy oil.

Comparative Example 3

The comparative example provides a composite support and a hydrogenation catalyst using the composite support and used for heavy oil.

A preparation method for the composite support comprises the following steps:
mixing 3 g of semi-coke pore-expanding material, 2 g of molecular sieve and 3 g of spent catalytic cracking catalyst, and grinding the obtained mixture until the grain size of the ground mixture is 50 microns, thereby obtaining the composite support,
wherein the semi-coke pore-expanding material is obtained through mixing semi-coke and sodium carbonate according to a mass ratio of 1:4, then, activating the obtained mixture for a period of 0.5 hour by using water vapor at a temperature of 920 DEG C., then, subjecting a pore-expanded sample to acid pickling, carrying out water washing, then, carrying out centrifugal separation, and carrying out drying for a period of 3 hours at a temperature of 120 DEG C., and has an average particle size of 80 microns, a specific surface area of 200 $m^2/g$, an average pore size of 75 nm and an average pore volume of 2.5 $cm^3/g$;
the molecular sieve is a Y-type molecular sieve and has an average particle size of 3 mm, a specific surface area of 250 $m^2/g$ and an average pore size of 8 nm; and
the spent catalytic cracking catalyst comprises the Y-type molecular sieve, aluminum oxide and metal oxides of nickel, vanadium and ferrum, which are in the mass ratio of 20:55:0.5, and the spent catalytic cracking catalyst has an average particle size of 100 microns, a specific surface area of 250 $m^2/g$ and an average pore size of 6 nm.

The hydrogenation catalyst for heavy oil is composed of the composite support and an active metal oxide loaded onto the composite support, wherein the mass ratio of the composite support to active metals in the active metal oxide is 100:0.5.

A preparation method for the hydrogenation catalyst for heavy oil comprises the following steps:
(1) impregnating the composite support in a mixed aqueous solution of metatungstic acid, nickel nitrate, cobalt nitrate and ferric nitrate for a period of 10 hours in an isometrical manner, wherein the condition that the mass ratio of the composite support to active metals is 100:0.5 and the mass ratio of oxides of nickel, cobalt and ferrum to oxides of tungsten is 2:1 is guaranteed;
(2) drying the impregnated composite support for a period of 8 hours at a temperature of 100 DEG C. to obtain a dried matter;
(3) calcining the dried matter for a period of 5 hours at a temperature of 450 DEG C. to obtain a calcined matter; and
(4) grinding the calcined matter until the grain size of the ground calcined matter is 50 microns, thereby obtaining the hydrogenation catalyst for heavy oil.

Comparative Example 4

The comparative example provides a composite support and a hydrogenation catalyst using the composite support and used for heavy oil.

A preparation method for the composite support comprises the following steps:
S1. mixing 3 g of semi-coke pore-expanding material, 2 g of molecular sieve and 3 g of spent catalytic cracking catalyst, followed by grinding and molding to obtain a molded material,
wherein the semi-coke pore-expanding material is obtained through mixing semi-coke and sodium carbonate according to a mass ratio of 1:4, then, activating the obtained mixture for a period of 0.5 hour by using water vapor at a temperature of 920 DEG C., then, subjecting a pore-expanded sample to acid pickling, carrying out water washing, then, carrying out centrifugal separation, and carrying out drying for a period of 3 hours at a temperature of 120 DEG C., and has an average particle size of 80 microns, a specific surface area of 200 $m^2/g$, an average pore size of 75 nm and an average pore volume of 2.5 $cm^3/g$;
the molecular sieve is a Y-type molecular sieve and has an average particle size of 3 mm, a specific surface area of 250 $m^2/g$ and an average pore size of 8 nm; and
the spent catalytic cracking catalyst comprises the Y-type molecular sieve, aluminum oxide and nickel-vanadium-and-ferrum, which are in the mass ratio of 20:55:0.5, and the spent catalytic cracking catalyst has an average particle size of 100 microns, a specific surface area of 250 $m^2/g$ and an average pore size of 6 nm;
S2. calcining the molded material for a period of 2 hours at a temperature of 700 DEG C. in a nitrogen gas atmosphere to obtain a calcined material;
S3. grinding the calcined material until the grain size of the ground calcined material is 50 microns, thereby obtaining the composite support, wherein shown by measurement through the international standard ISO 15901, the composite support contains 32% (by volume) of macropores, 18% (by volume) of mesopores and the balance of micropores.

The hydrogenation catalyst for heavy oil is composed of the composite support and an active metal oxide loaded onto the composite support, wherein the mass ratio of the composite support to active metals in the active metal oxide is 100:0.5.

A preparation method for the hydrogenation catalyst for heavy oil comprises the following steps:
(1) impregnating the composite support in a mixed aqueous solution of metatungstic acid, nickel nitrate, cobalt nitrate and ferric nitrate for a period of 10 hours in an isometrical manner, wherein the condition that the mass ratio of the composite support to active metals is 100:0.5 and the mass ratio of oxides of nickel, cobalt and ferrum to oxides of tungsten is 2:1 is guaranteed;

(2) drying the impregnated composite support for a period of 8 hours at a temperature of 100 DEG C. to obtain a dried matter;

(3) calcining the dried matter for a period of 5 hours at a temperature of 450 DEG C. to obtain a calcined matter; and (4) grinding the calcined matter until the grain size of the ground calcined matter is 50 microns, thereby obtaining the hydrogenation catalyst for heavy oil.

Comparative Example 5

The comparative example provides a composite support and a hydrogenation catalyst using the composite support and used for heavy oil.

A preparation method for the composite support comprises the following steps:
S1. mixing 3 g of semi-coke pore-expanding material, 2 g of molecular sieve and 3 g of spent catalytic cracking catalyst, followed by grinding and molding to obtain a molded material,
wherein the semi-coke pore-expanding material is obtained through mixing semi-coke and sodium carbonate according to a mass ratio of 1:4, then, activating the obtained mixture for a period of 0.5 hour by using water vapor at a temperature of 920 DEG C., then, subjecting a pore-expanded sample to acid pickling, carrying out water washing, then, carrying out centrifugal separation, and carrying out drying for a period of 3 hours at a temperature of 120 DEG C., and has an average particle size of 80 microns, a specific surface area of 200 $m^2/g$, an average pore size of 75 nm and an average pore volume of 2.5 $cm^3/g$;
the molecular sieve is a Y-type molecular sieve and has an average particle size of 3 mm, a specific surface area of 250 $m^2/g$ and an average pore size of 8 nm; and
the spent catalytic cracking catalyst comprises the Y-type molecular sieve, aluminum oxide and nickel-vanadium-and-ferrum, which are in the mass ratio of 20:55:0.5, and the spent catalytic cracking catalyst has an average particle size of 100 microns, a specific surface area of 250 $m^2/g$ and an average pore size of 6 nm;
S3. activating the molded material for a period of 1.8 hours by using water vapor at a temperature of 920 DEG C. to obtain an activated material; and
S4. grinding the activated material until the grain size of the ground activated material is 50 microns, thereby obtaining the composite support, wherein shown by measurement through the international standard ISO 15901, the composite support contains 40% (by volume) of macropores, 20% (by volume) of mesopores and the balance of micropores.

The hydrogenation catalyst for heavy oil is composed of the composite support and an active metal oxide loaded onto the composite support, wherein the mass ratio of the composite support to active metals in the active metal oxide is 100:0.5.

A preparation method for the hydrogenation catalyst for heavy oil comprises the following steps:
(1) impregnating the composite support in a mixed aqueous solution of metatungstic acid, nickel nitrate, cobalt nitrate and ferric nitrate for a period of 10 hours in an isometrical manner, wherein the condition that the mass ratio of the composite support to active metals is 100:0.5 and the mass ratio of oxides of nickel, cobalt and ferrum to oxides of tungsten is 2:1 is guaranteed;

(2) drying the impregnated composite support for a period of 8 hours at a temperature of 100 DEG C. to obtain a dried matter;

(3) calcining the dried matter for a period of 5 hours at a temperature of 450 DEG C. to obtain a calcined matter; and (4) grinding the calcined matter until the grain size of the ground calcined matter is 50 microns, thereby obtaining the hydrogenation catalyst for heavy oil.

Comparative Example 6

A method for regenerating a spent hydrogenation catalyst, provided by the comparative example, comprises the following steps:
S1. carrying out solid-liquid separation on a liquid mixture of a spent catalyst and a heavy oil product discharged from the bottom of a vacuum distillation tower after a heavy oil feedstock and high-temperature coal tar are subjected to a suspended-bed hydrogenation process under the action of a suspended-bed hydrogenation catalyst, by adopting an automatic-back-purged filter, to obtain a filter cake, i.e., the spent hydrogenation catalyst;
S2. subjecting the spent hydrogenation catalyst to dry distillation treatment for a period of 2.5 hours at a temperature of 400 DEG C. to obtain a dehydrated and deoiled catalyst A and a dry distillation gas, then, carrying out dust removal on the dry distillation gas to obtain a dust and a dedusted dry distillation gas, mixing the obtained dust with the catalyst A, cooling the dedusted dry distillation gas to obtain a high-boiling-point oil-water mixture and a combustible low-boiling-point gas, subjecting the high-boiling-point oil-water mixture to oil-water separation to obtain crude product oil and oil-containing wastewater, subjecting the combustible low-boiling-point gas to filtering to obtain a clean combustible gas, and storing the combustible gas for later use;
S3. grinding the catalyst A until the grain size of the ground catalyst A is 20 microns, thereby obtaining a regenerated hydrogenation catalyst.

Comparative Example 7

A method for regenerating a spent hydrogenation catalyst, provided by the comparative example, comprises the following steps:
S1. carrying out solid-liquid separation on a liquid mixture of a spent catalyst and a heavy oil product discharged from the bottom of a vacuum distillation tower after a heavy oil feedstock and normal-pressure residual oil are subjected to a suspended-bed hydrogenation process under the action of a suspended-bed hydrogenation catalyst, by adopting a plate-and-frame filter, to obtain filter residue, i.e., the spent hydrogenation catalyst;
S2. subjecting the spent hydrogenation catalyst to dry distillation treatment for a period of 4 hours at a temperature of 300 DEG C. to obtain a dehydrated and deoiled catalyst A and a dry distillation gas, then, carrying out dust removal on the dry distillation gas to obtain a dust and a dedusted dry distillation gas, mixing the obtained dust with the catalyst A, cooling the dedusted dry distillation gas to obtain a high-boiling-point oil-water mixture and a combustible low-boiling-point gas, subjecting the high-boiling-point oil-water mixture to oil-water separation to obtain crude product oil and oil-containing wastewater, subjecting the combustible low-boiling-point gas to filtering to obtain a clean combustible gas, and storing the combustible gas for later use;

S3. activating the dehydrated and deoiled catalyst A for a period of 0.5 hour at a temperature of 950 DEG C. by using water vapor to obtain a catalyst B; and S4. grinding the catalyst B until the grain size of the ground catalyst B is 50 microns, thereby obtaining a regenerated hydrogenation catalyst.

Comparative Example 8

A method for regenerating a spent hydrogenation catalyst, provided by the comparative example, comprises the following steps:

S1. carrying out solid-liquid separation on a liquid mixture of a spent catalyst and a heavy oil product discharged from the bottom of a vacuum distillation tower after a heavy oil feedstock and normal-pressure residual oil are subjected to a suspended-bed hydrogenation process under the action of a suspended-bed hydrogenation catalyst, by adopting a plate-and-frame filter, to obtain filter residue, i.e., the spent hydrogenation catalyst;

S2. subjecting the spent hydrogenation catalyst to dry distillation treatment for a period of 1.5 hours at a temperature of 850 DEG C. to obtain a dehydrated and deoiled catalyst A and a dry distillation gas, then, carrying out dust removal on the dry distillation gas to obtain a dust and a dedusted dry distillation gas, mixing the obtained dust with the catalyst A, cooling the dedusted dry distillation gas to obtain a high-boiling-point oil-water mixture and a combustible low-boiling-point gas, subjecting the high-boiling-point oil-water mixture to oil-water separation to obtain crude product oil and oil-containing wastewater, subjecting the combustible low-boiling-point gas to filtering to obtain a clean combustible gas, and storing the combustible gas for later use;

S3. activating the dehydrated and deoiled catalyst A for a period of 0.5 hour at a temperature of 950 DEG C. by using water vapor to obtain a catalyst B; and S4. grinding the catalyst B until the grain size of the ground catalyst B is 50 microns, thereby obtaining a regenerated hydrogenation catalyst.

Comparative Example 9

A method for regenerating a spent hydrogenation catalyst, provided by the comparative example, comprises the following steps:

S1. carrying out centrifugal separation on a liquid mixture of a spent catalyst and a heavy oil product discharged from the bottom of a vacuum distillation tower after a heavy oil feedstock and a mixture of medium-/low-temperature coal tar and asphalt are subjected to a suspended-bed hydrogenation process under the action of a suspended-bed hydrogenation catalyst, by adopting a centrifugal separator, to obtain solid residue, i.e., the spent hydrogenation catalyst;

S2. subjecting the spent hydrogenation catalyst to dry distillation treatment for a period of 2 hours at a temperature of 700 DEG C. to obtain a dehydrated and deoiled catalyst A and a dry distillation gas, then, carrying out dust removal on the dry distillation gas to obtain a dust and a dedusted dry distillation gas, mixing the obtained dust with the catalyst A, cooling the dedusted dry distillation gas to obtain a high-boiling-point oil-water mixture and a combustible low-boiling-point gas, subjecting the high-boiling-point oil-water mixture to oil-water separation to obtain crude product oil and oil-containing wastewater, subjecting the combustible low-boiling-point gas to filtering to obtain a clean combustible gas, and storing the combustible gas for later use;

S3. activating the dehydrated and deoiled catalyst A for a period of 2 hours at a temperature of 800 DEG C. by using water vapor to obtain a catalyst B; and S4. grinding the catalyst B until the grain size of the ground catalyst B is 100 microns, thereby obtaining a regenerated hydrogenation catalyst.

Comparative Example 10

A method for regenerating a spent hydrogenation catalyst, provided by the comparative example, comprises the following steps:

S1. carrying out centrifugal separation on a liquid mixture of a spent catalyst and a heavy oil product discharged from the bottom of a vacuum distillation tower after a heavy oil feedstock and a mixture of medium-/low-temperature coal tar and asphalt are subjected to a suspended-bed hydrogenation process under the action of a suspended-bed hydrogenation catalyst, by adopting a centrifugal separator, to obtain solid residue, i.e., the spent hydrogenation catalyst;

S2. subjecting the spent hydrogenation catalyst to dry distillation treatment for a period of 2 hours at a temperature of 600 DEG C. to obtain a dehydrated and deoiled catalyst A and a dry distillation gas, then, carrying out dust removal on the dry distillation gas to obtain a dust and a dedusted dry distillation gas, mixing the obtained dust with the catalyst A, cooling the dedusted dry distillation gas to obtain a high-boiling-point oil-water mixture and a combustible low-boiling-point gas, subjecting the high-boiling-point oil-water mixture to oil-water separation to obtain crude product oil and oil-containing wastewater, subjecting the combustible low-boiling-point gas to filtering to obtain a clean combustible gas, and storing the combustible gas for later use;

S3. activating the dehydrated and deoiled catalyst A for a period of 1 hour at a temperature of 1,000 DEG C. by using water vapor to obtain a catalyst B; and S4. grinding the catalyst B until the grain size of the ground catalyst B is 100 microns, thereby obtaining a regenerated hydrogenation catalyst.

Experimental Example 1

The hydrogenation catalyst for heavy oil, prepared in the embodiments 1 to 5 and the comparative examples 1 to 5, is applied to a suspended-bed hydrogenation process for a heavy oil feedstock to test the suspended-bed-hydrogenation catalytic performance of the hydrogenation catalyst, and the specific test conditions are as follows: residual oil (properties of the residual oil are as shown in the following table 1) serves as a reaction feedstock, 280 g of the residual oil and the hydrogenation catalyst for heavy oil, prepared in the embodiments 1 to 5 and the comparative examples 1 to 5, of which the weight is 1% of that of the residual oil, are separately added into a high-pressure reactor with the volume of 1 L, and a suspended-bed hydrogenation reaction is carried out on the residual oil for a period of 1.5 hours at a temperature of 450 DEG C. while the pressure of hydrogen gas is maintained to 20 MPa; and after the reaction is completed, taken-out liquid oil is weighed, and corresponding performance indexes are calculated according to the following formulae:

Yield of light oil=mass of distillate fractions below 350 DEG C./mass of raw oil*100%

Conversion ratio of the residual oil=mass of components (containing gas) below 524 DEG C./mass of raw oil*100%

Coking yield=mass of toluene insolubles/mass of raw oil*100%

Corresponding activity test results are as shown in the following table 2:

TABLE 1

Properties of the residual oil

| | |
|---|---|
| Density (20 DEG C.), Kg/m³ | 0.9423 |
| Carbon residue, wt % | 14.52 |
| Sulfur, wt % | 4.51 |
| Colloid, wt % | 18.4 |
| Asphaltene, wt % | 13.2 |
| Fe, microgram per gram | 14 |
| Ni, microgram per gram | 35 |
| V, microgram per gram | 56 |

TABLE 2

| | Conversion ratio of the residual oil/wt % | Yield of light oil/wt % | Coking yield/wt % |
|---|---|---|---|
| Embodiment 1 | 98.5 | 93.2 | 3.5 |
| Embodiment 2 | 98.0 | 93.2 | 3.7 |
| Embodiment 3 | 98.2 | 93.5 | 3.6 |
| Embodiment 4 | 98.6 | 94.0 | 3.68 |
| Embodiment 5 | 98.5 | 93.7 | 3.67 |
| Comparative Example 1 | 70.2 | 43.2 | 10.4 |
| Comparative Example 2 | 71.2 | 44.5 | 10.1 |
| Comparative Example 3 | 60.5 | 35.1 | 11.8 |
| Comparative Example 4 | 70.5 | 43.4 | 10.6 |
| Comparative Example 5 | 68.5 | 42.4 | 10.9 |

Learnt from the table 2: compared with the hydrogenation catalysts prepared by all the comparative examples, the hydrogenation catalyst prepared by the present invention has the advantages of high conversion ratio of residual oil and high yield of light oil and low coking yield, and the reason is that the hydrogenation catalyst which has uniformly-distributed multi-level pore sizes and uniformly-loaded active ingredients is adopted by the present invention. The probability of contact between all ingredients in heavy oil and active ingredients in the hydrogenation catalyst during hydrogenation is increased due to the hydrogenation catalyst, particularly, coking substances such as asphaltenes can be catalytically cracked effectively, the destruction to the hydrogenation catalyst caused by the coking substances is avoided, and the service life of the hydrogenation catalyst is prolonged. At the same time, the conversion ratio of the heavy oil is increased. The hydrogenation catalyst integrates adsorption, cracking and hydrogenation properties, so that the problem that the content of impurities and metals in the heavy oil is high can be effectively solved, the coking of substances prone to coking is prevented, and meanwhile, the yield of light oil in a suspended-bed hydrogenation process is increased.

Experimental Example 2

The regenerated hydrogenation catalyst prepared in the embodiments 6 to 12 and the comparative examples 6 to 10 is applied to a suspended-bed hydrogenation process for a heavy oil feedstock to test the suspended-bed-hydrogenation catalytic performance of the regenerated hydrogenation catalyst, and the specific test conditions are as follows: medium-/low-temperature coal tar serves as a reaction feedstock, 280 g of the medium-/low-temperature coal tar and 1% of the regenerated hydrogenation catalyst prepared in the embodiments 6 to 12 and the comparative examples 6 to 10 are separately added into a high-pressure reactor with the volume of 1 L, and a suspended-bed hydrogenation reaction is carried out on the medium-/low-temperature coal tar for a period of 1.5 hours at a temperature of 450 DEG C. while the pressure of hydrogen gas is maintained to 20 MPa; and after the reaction is completed, taken-out liquid oil is weighed, and the conversion ratio of inferior heavy oil is obtained according to a formula: conversion ratio of coal tar=mass of components (containing gas) below 524 DEG C./mass of raw oil*100%. Corresponding activity test results are as shown in the following table 3:

TABLE 3

| | Conversion ratio of inferior heavy oil/wt % |
|---|---|
| Embodiment 6 | 92.2% |
| Embodiment 7 | 93.5% |
| Embodiment 8 | 89.5% |
| Embodiment 9 | 90.4% |
| Embodiment 10 | 89.6% |
| Embodiment 11 | 93.7% |
| Embodiment 12 | 95.5% |
| Comparative Example 6 | 45.0% |
| Comparative Example 7 | 81.3% |
| Comparative Example 8 | 79.1% |
| Comparative Example 9 | 80.4% |
| Comparative Example 10 | 79.5% |
| New hydrogenation catalyst | 93.9% |

Learnt from data in the table 3 above: the regenerated hydrogenation catalyst obtained through carrying out recovery preparation by the method disclosed by the present invention still maintains excellent suspended-bed-hydrogenation catalytic performance, the conversion ratio of the inferior heavy oil is decreased slightly compared with that of a new hydrogenation catalyst, however, the regenerated hydrogenation catalyst prepared by the method has remarkable suspended-bed-hydrogenation catalytic performance compared with hydrogenation catalysts prepared in case of not carrying out activating treatment, not being in a dry distillation temperature range of the present invention or not being in an activating temperature range of the present invention.

Apparently, the above-mentioned embodiments are only illustrated for distinct description, but not intended to limit embodiments. For those having ordinary skill in the art, changes or variations of other different forms can also be made on the basis of the above-mentioned description. Herein, all embodiments are not required to and cannot be exhaustive. Readily apparent changes or variations evolved therefrom still fall within the protection scope of the present invention.

The invention claimed is:

1. A catalyst composite support, comprising
a semi-coke pore-expanding material,
a molecular sieve and
a spent catalytic cracking catalyst,
wherein the mass ratio of the semi-coke pore-expanding material to the molecular sieve to the spent catalytic cracking catalyst is (1 to 5):(2 to 4):(0.5 to 5);
the semi-coke pore-expanding material has a specific surface area of 150 $m^2/g$ to 300 $m^2/g$ and an average pore size of 70 nm to 80 nm;
the molecular sieve has a specific surface area of 200 $m^2/g$ to 300 $m^2/g$ and an average pore size of 5 nm to 10 nm; and
the spent catalytic cracking catalyst has a specific surface area of 50 $m^2/g$ to 300 $m^2/g$ and an average pore size of 3 nm to 7 nm.

2. The composite support according to claim 1, wherein the semi-coke pore-expanding material has an average particle size of 60 to 100 microns and an average pore volume of 2 $cm^3/g$ to 3 $cm^3/g$.

3. The composite support according to claim 1, wherein the molecular sieve has an average particle size of 1 mm to 4 mm.

4. The composite support according to claim 1, wherein the spent catalytic cracking catalyst has an average particle size of no greater than 150 microns.

5. The composite support according to claim 1, wherein on the basis of the mass of the spent catalytic cracking catalyst, the spent catalytic cracking catalyst comprises the following ingredients in parts by mass:
Y-type molecular sieve 15-55 parts;
aluminum oxide 15-55 parts; and
at least one of nickel, vanadium and ferrum 0.5-1 part.

6. A preparation method for the catalyst composite support according to claim 1, characterized by comprising the following steps:

(S1) mixing the semi-coke pore-expanding material, the molecular sieve and the spent catalytic cracking catalyst, followed by molding to obtain a molded material;
(S2) calcining the molded material in an oxygen-free condition to obtain a calcined material; and
(S3) activating the calcined material with a gas to obtain the catalyst composite support.

7. The preparation method according to claim 6, wherein the step (S1) further comprises the step of
separately grinding the semi-coke pore-expanding material, the molecular sieve and the spent catalytic cracking catalyst prior to mixing, or
grinding the molded material obtained by mixing the semi-coke pore-expanding material, the molecular sieve and the spent catalytic cracking catalyst.

8. The preparation method according to claim 6, wherein the calcining is carried out at a temperature of 650 DEG C. to 750 DEG C. for a period of 1.5 to 2.5 hours.

9. The preparation method according to claim 6, wherein in the step (S3), the gas is an oxidizing gas; and
the activating is carried out at a temperature of 900 DEG C. to 950 DEG C. for a period of 1.5 to 2 hours.

10. A hydrogenation catalyst, comprising
the catalyst composite support according to claim 1, and
an active metal oxide loaded onto the catalyst composite support.

11. The hydrogenation catalyst according to claim 10, wherein the active metal oxide is selected from VIII metal oxide, VIB metal oxide, or a mixture thereof;
the mass ratio of the composite support to active metals in the active metal oxide is 100:(0.5 to 10); and
the mass ratio of the VIII metal oxide to the VIB metal oxide is (1 to 20):(0.5 to 10).

* * * * *